United States Patent
Marcellin-Dibon et al.

[11] Patent Number: 5,900,973
[45] Date of Patent: May 4, 1999

[54] OPTICAL POLARIZATION DEVICE AND PROJECTION SYSTEM OF LIQUID CRYSTAL VALVE TYPE UTILIZING SUCH A DEVICE

[75] Inventors: Eric Marcellin-Dibon, Rennes; Valter Drazic, Betton, both of France

[73] Assignee: Thomson multimedia S.A., Boulogne Cedex, France

[21] Appl. No.: 08/652,236

[22] Filed: May 23, 1996

[30] Foreign Application Priority Data

Jun. 21, 1995 [FR] France .................................. 95 07396

[51] Int. Cl.⁶ .................................................. G02B 5/30
[52] U.S. Cl. ........................... 359/487; 359/483; 359/485
[58] Field of Search ........................ 353/20, 38; 362/19; 349/5, 9; 359/483, 485, 487, 495, 496, 497, 498, 500, FOR 100, 38, 40

[56] References Cited

U.S. PATENT DOCUMENTS

| | | | |
|---|---|---|---|
| 5,042,921 | 8/1991 | Sato et al. | 349/9 |
| 5,459,592 | 10/1995 | Shibatani et al. | 349/5 |
| 5,587,816 | 12/1996 | Gunjima et al. | 349/62 |

FOREIGN PATENT DOCUMENTS

| | | | |
|---|---|---|---|
| 0422661 | 4/1991 | European Pat. Off. | 359/495 |
| 0460241 | 11/1991 | European Pat. Off. | G02B 27/28 |

OTHER PUBLICATIONS

Patent Abstracts of Japan vol. 018 No. 267 (P–1741), May 20, 1994 & JP A 06 043453 (Casio Comput Co Ltd) Feb. 18, 1994.
Patent Abstracts of Japan vol. 016 No. 252 (P–1367) Jun. 9, 1992 & JP A 04 058214 (Mitsubishi Rayon Co Ltd) Feb. 25, 1992.
Copy of Search Report.

*Primary Examiner*—Cassandra Spyrou
*Assistant Examiner*—John Juba, Jr.
*Attorney, Agent, or Firm*—Joseph S. Tripoli; Dennis H. Irlbeck

[57] ABSTRACT

An optical polarization device including a source of light emitting a light beam, and a polarization beam splitter for reflecting the s-polarization component of the light beam and transmitting the p-polarization component. A Fresnel structure with a reflective coating receives the s-polarization component, rotates it 90 degrees and returns it to the beam splitter. A plate of micro-prisms, functioning in reflection total, recombine the two polarization components of the light beam so as to produce a collimated beam.

6 Claims, 5 Drawing Sheets

OPTICAL POLARIZATION DEVICE AND PROJECTION SYSTEM OF LIQUID CRYSTAL VALVE TYPE UTILIZING SUCH A DEVICE

BACKGROUND OF THE INVENTION

The present invention concerns an optical polarization device, and more particularly a device enabling randomly polarized light from a light source to be transformed into linearly polarized light, and a projection system of the liquid crystal valve type utilizing such an optical device.

DESCRIPTION OF THE PRIOR ART

It is known that liquid crystal systems such as projectors having a liquid crystal display functioning as an optical valve or direct viewing LCD systems have a low level of optical transmission. These systems must be illuminated using linearly polarized light, which necessitates the use of a polarizer. Unfortunately a polarizer absorbs more than 50% of the incident light. To overcome this disadvantage, various types of polarization converters have been proposed.

As shown in FIG. 1, an optical polarization device of classical type comprises a light source 1 that can be for example a tungsten, halogen or xenon lamp, or similar lamp. This lamp 1 is partially surrounded by an elliptic or parabolic reflector 2. The lamp emits a randomly polarized light beam onto a polarization beam splitter 3 of classical type that transmits directly the p-polarization component of the light beam, labeled p1 in the figure, and reflects the s-polarization component of the light beam, labeled s2. This component s2 passes through a half-wave plate 5' in which the plane of polarization undergoes a 90° rotation. This system therefore provides two polarization components labeled p1 and p2 that illuminate the liquid crystal valve 6. The main disadvantage of these two parallel beams p1, p2 is that their intensities are different, which means that the illumination of the liquid crystal valve is non-uniform.

Another solution that avoids two parallel beams is to place the mirror 4 and the half-wave plate 5' in such a way that the two beams p1 and p2 are superimposed in the plane of the liquid crystal valve 6'. This solution is shown in FIG. 2 in which the same items as those in FIG. 1 carry the same references; the references of those items whose position has been changed carry a prime. The beams p1 and p2 pass, in a known manner, through a field lens 7 before reaching the valve 6, after which they are sent to the plane of the pupil of the projection lens 8. However, as the beams p1 and p2 have different angles of incidence on the field lens, they do not focus at the same point on the plane of the pupil but at two points p'1 and p'2, as shown clearly in FIG. 2. This imposes the use of a projection lens having a very large aperture, which is expensive.

To overcome the disadvantages above, the European patent application No. 0 422 661 proposes an optical polarization device including a polarization beam splitter of classical type, means of reflection receiving the component reflected by the polarization beam splitter, rotating its plane of polarization through 90° to obtain a reflected component of opposite polarity and returning to the polarization beam splitter, and means of recombination of the two components constituted by diffracting elements. However, this system still has some disadvantages, notably as regards the angular dispersion of the output beam and the necessity for a projection objective of large aperture.

SUMMARY OF THE INVENTION

The object of the present invention is to overcome these disadvantages by proposing a new optical polarization device providing efficient recombination of the beams and a low level of dispersion.

The invention is a optical polarization device including:

a source of light emitting a light beam;

a polarization beam splitter reflecting the s-polarization component of the light beam and transmitting the p-polarization component;

means of reflection receiving the component reflected by said polarization beam splitter, rotating its plane of polarization through 90° then returning it to said polarization beam splitter;

means of recombination of the two polarization components of the light beam so as to obtain a collimated beam;

wherein said means of recombination of the two polarization components of the light beam is constituted by a plate of micro-prisms functioning in reflection total.

In a preferred embodiment, said plate of micro-prisms is made of transparent material such as a methacrylate, a polycarbonate, glass or similar. The surface of this plate that receives the polarization components of the light beam is constituted by several prismatic elements arranged in parallel rows, the other surface being plane and transmitting the collimated beam, in which each adjacent inclined surface of said prismatic elements makes an angle $\alpha$ with a normal to said plane surface, this angle satisfying the following conditions:

$$\cos(\alpha+\theta_\beta)=n\cos(3\alpha)$$

$$(90°-\alpha)>\theta_{critical}$$

with $\theta_{critical}=\text{Arc sin}(1/n)$ and $\theta_\beta$ is the angle of incidence of the light beam from said polarization beam splitter relative to a normal to said plane surface and n is the refractive index of said plate of micro-prisms.

Another characteristic of the invention is that the polarization beam splitter is constituted by a stack of at least two glass plates separated by a layer of air.

The use of an air-glass stack for the polarization beam splitter gives an angle of incidence on said means of recombination corresponding to Brewster's angle and we notice that the assembly comprising an air-glass stack and means of recombination constituted by a totally reflecting plate of microprisms provides an anamorphosis of 16/9 corresponding to the new 16/9 format of the television receivers whereas a classical polarization beam splitter based on a prism gives an anomorphosis of 4/3 corresponding to the standard format.

Another characteristic of the invention to obtain a structure that is preferably even more compact, is that said means of reflection is constituted by a linear Fresnel structure with a reflective coating. In this case, the angle $\beta$ made by the reflecting surface relative to said plane surface is equal to $2\theta_\beta-90°$.

Another object of the invention is a projection system of the liquid crystal valve type including an optical polarization device of the type described above followed by a field lens, a liquid crystal valve and a projection lens.

BRIEF DESCRIPTION OF THE DRAWINGS

The invention will be better understood and other advantages and characteristics will become clear on reading the following description, the description making reference to the appended figures, of which:

FIG. 6 represents the dispersion of the two means when they are illuminated by a collimated beam with an angle of incidence corresponding to Brewster's angle; FIG. 7 shows the angular transfer function of the two systems for a p-polarization beam;

FIG. 3 shows a complete system of illumination of an LCD projector. This system of projection through a liquid crystal screen includes, in a known configuration, a lamp 10 that can be an arc lamp of metallic halogen type, a filament lamp or similar. This lamp 10 is placed at the focus of a parabolic or elliptic reflector 11 and is fitted with a condenser. The light emitted by the lamp is randomly polarized white light. It is reflected by the reflector and transmitted to a polarization converter assembly including a polarization beam splitter 12 which, in the present embodiment, is preferably a stack of glass plates arranged as an air-glass stack. However, as will be described later, this polarization beam splitter can be also a splitter of classical type, such as a prism.

Figure 1:
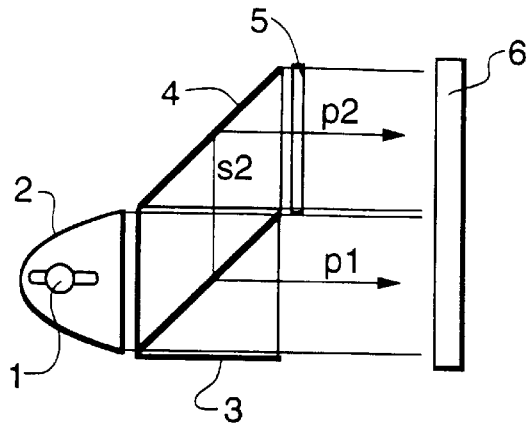
FIG. 1, already described, is a schematic representation of a first prior-art optical polarization device.
Figure 2:
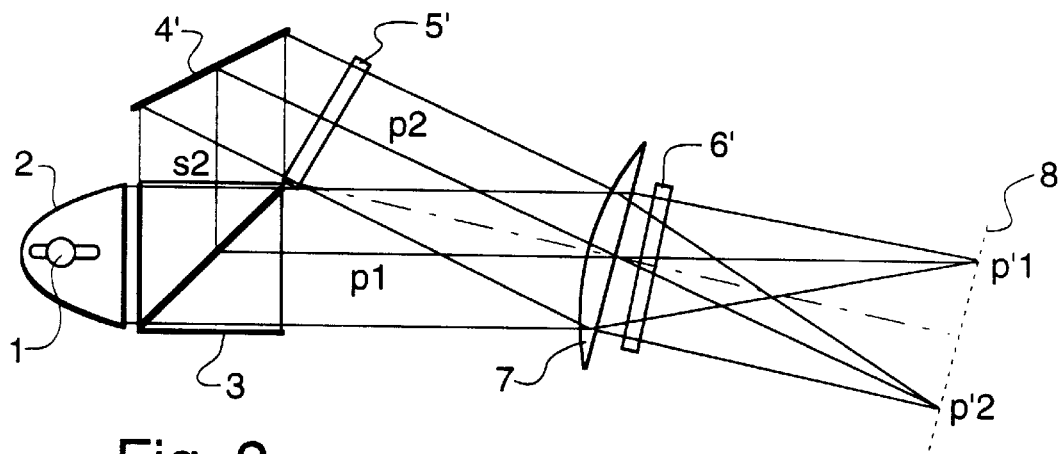
FIG. 2, already described, is a schematic representation of another prior-art optical polarization device.

The polarization converter also includes a mirror 13 whose purpose is to reflect the s-polarization component of the light beam towards the polarization beam splitter. A quarter-wave plate 14 is placed before this mirror 13 in order to rotate the plane of polarization of the reflected beam through 90°. At the output of the polarization beam splitter there is a means 15 of recombination of the polarization components that will be described later in more detail. The beam from this means 15 is sent in a known way to a field lens 16, then to a liquid crystal screen 17 or an electro-optic modulator functioning as an optical valve. The image from the liquid crystal screen is sent to a projection lens 18.

In this device, the light beam from the lamp 10 is sent to the polarization beam splitter 12. In a known manner, the p-polarization component of the beam passes directly through the polarization beam splitter whereas the s-polarization component is reflected and sent towards the mirror 13 where it is totally reflected and again traverses the quarter-wave plate such that the plane of polarization is rotated through 90°. The new component labeled p' returns to the polarization beam splitter 12. The transmitted p and p' components arrive at the means 15 of recombination of the beam which, according to the present invention, comprises total reflection means of recombination. The components obtained at the output are therefore parallel components polarization which are superimposed on each other, as explained below.

Figure 4:
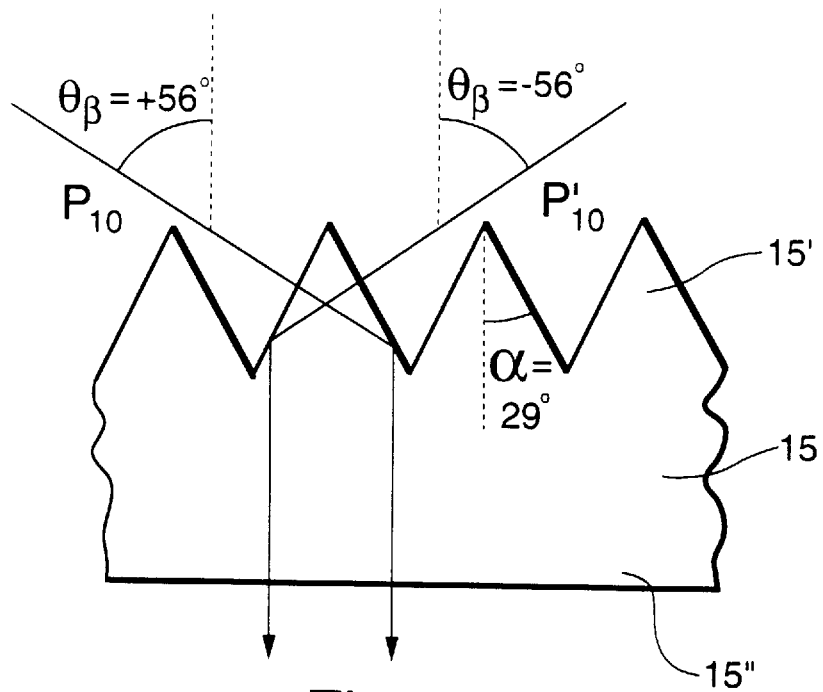
FIG. 4 is an enlarged sectional view of the means of recombination according to the invention.

FIG. 4 shows the means 15 of recombination of the polarization components according to the present invention. This means functions by total reflection and is constituted by a transparent plate made of material such as methacrylate (for example, the material known under the brand-name "plexiglass") or a polycarbonate or other similar material; glass can also be used. As shown clearly in FIG. 4, this means includes, on its face receiving the beam from the polarization beam splitter, a set of micro-prisms 15' arranged in parallel rows. The other face 15" is flat. Therefore, as shown in FIG. 4, the angle of incidence of the beam on the inclined external surface of the micro-prism is almost 90°. The beam penetrates the micro-prism and is incident on the internal face of the adjacent surface from which it reflects and exits the face 15" perpendicularly. This is represented in FIG. 4 by the paths followed by the rays p10 and p'10. To satisfy these conditions, the angle of incidence $\theta_\beta$ and the angle $\alpha$ of a side of a micro-prism with respect to this same line perpendicular to the face 15" must satisfy the following relations:

$$\cos(\alpha+\theta_\beta)=n\cos(3\alpha)$$

$$(90°+\alpha)>\theta_{critical}$$

with $\theta_{critical}$=Arc sin (1/n) wherein $\theta_\beta$ is the angle of incidence of the light beam from the polarization beam splitter with respect to a normal to the plane surface and n is the refractive index of the plate of micro-prisms.

When the polarization beam splitter is constituted, as mentioned above, by an air-glass stack, the angle $\theta_\beta$ is equal to Brewster's angle, which is 56.6° for glass. However, we notice that the degree of polarization splitting remains high and varies little for variations of $\theta_\beta$ of the order of ±10°. In fact, the angle of incidence, when we use a polarization beam splitter constituted by an air-glass stack, is equal to Brewster's angle plus or minus a few degrees (2 or 3 degrees). In this case, as shown in FIG. 4, the angle $\alpha$ is equal to 29°, if the plate of micro-prisms is made of "plexiglass" having an index n=1.49 for light of wavelength 587 nm. If the plate is made of polycarbonate, n=1.58, and if the plate is made of glass, n=1.5168, this modifies accordingly the value of $\alpha$ when $\theta_\beta$ remains equal to Brewster's angle.

Figure 5:
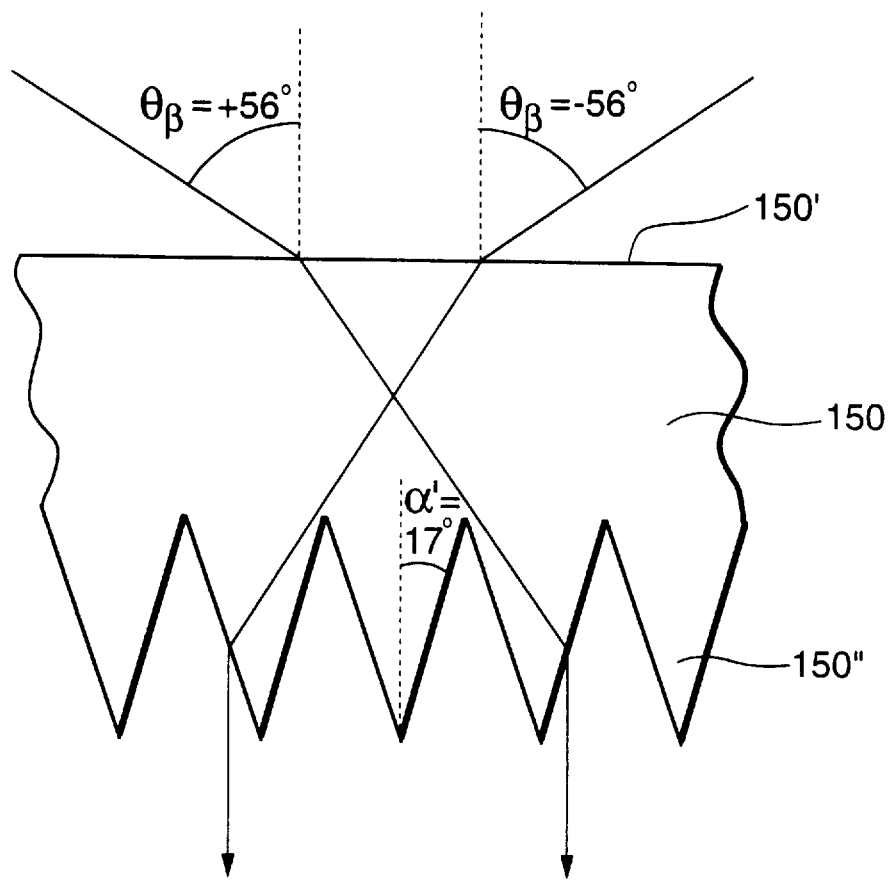
FIG. 5 is an enlarged sectional view of means of recombination used in the prior art.
Figure 6:
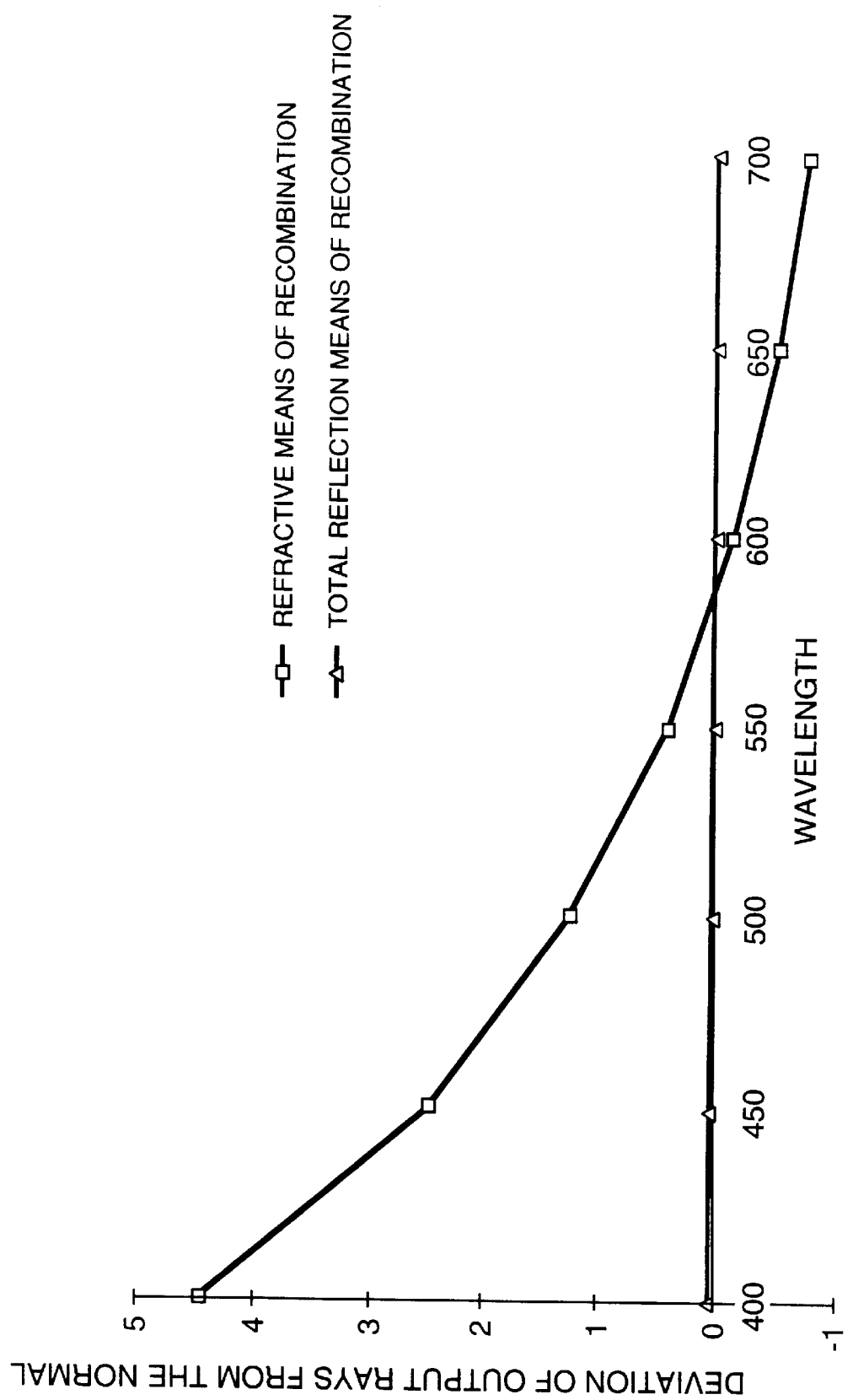
FIGS. 6 and 7 are graphs showing the advantages provided by the means of recombination in FIG. 4 compared with the means of recombination in FIG. 5; more particularly.
Figure 7:
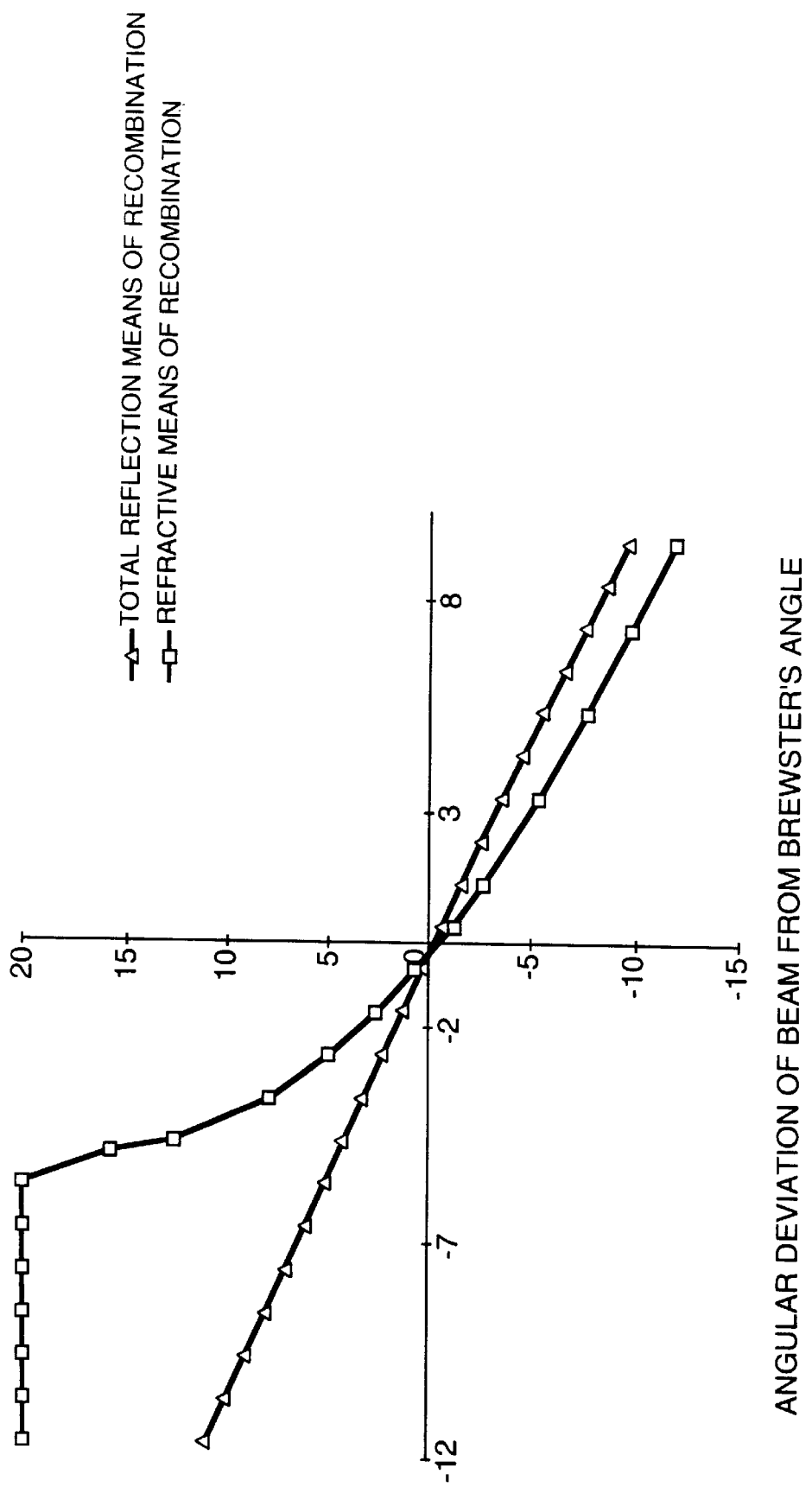

To show the advantages of the solution according to the invention compared with the prior-art solution described in the patent EP 0 422 661, FIG. 5 shows means of recombination constituted by a refractive element. The means 150 is constituted by a transparent plate whose surface 150' receiving the rays from the splitter is a plane surface, whereas the surface emitting the two parallel rays is a surface 150' constituted by micro-prisms. In this case, if the angle of incidence $\theta_\beta$ is chosen to be Brewster's angle, the angle $\alpha'$ of the micro-prisms is equal to 17°. The differences of results obtained between the solution according to the present invention and this prior-art solution in which we chose an air-glass stack as the polarization beam splitter, are illustrated by the graphs in FIGS. 6 and 7. The curve in FIG. 6 shows the dispersion due to the means of recombination when this is illuminated by a collimated beam at Brewster's angle. In this case, we see that the deviation of the output rays relative to the normal, as a function of the wavelength, is much larger with the prior-art system than for the system according to the invention for which there is no deviation. Similarly, in FIG. 7, which shows the angular transfer function for a p-polarized beam of the two means of recombination, we observe that the broadening of the output beam relative to the normal as a function of the angular deviation of the beam from Brewster's angle is much more pronounced in the prior-art system than in the system according to the invention, for which this broadening is substantially linear.

Figure 3:
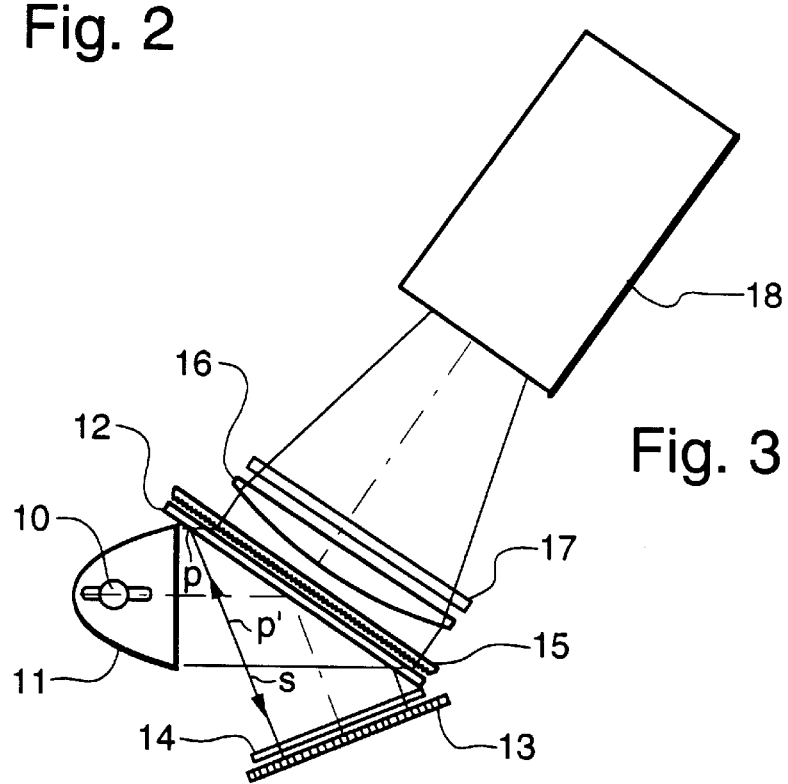
FIG. 3 is a schematic representation of an optical polarization device according to the invention.
Figure 8:
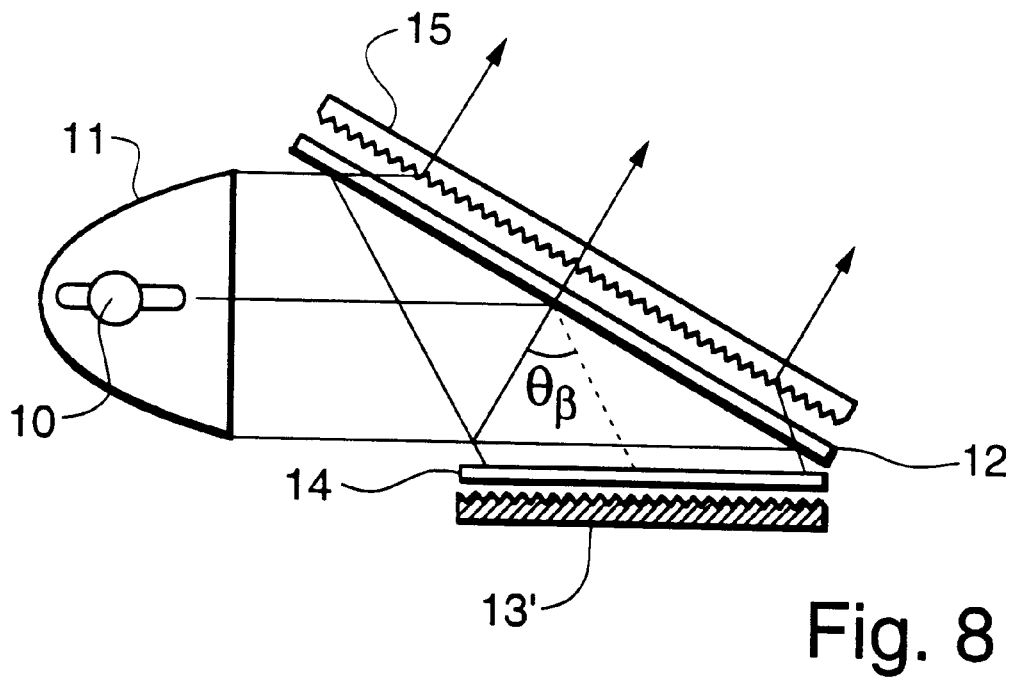
FIG. 8 is a schematic view of a compact optical polarization device including a linear reflecting Fresnel structure according to another embodiment of the present invention.
Figure 9:
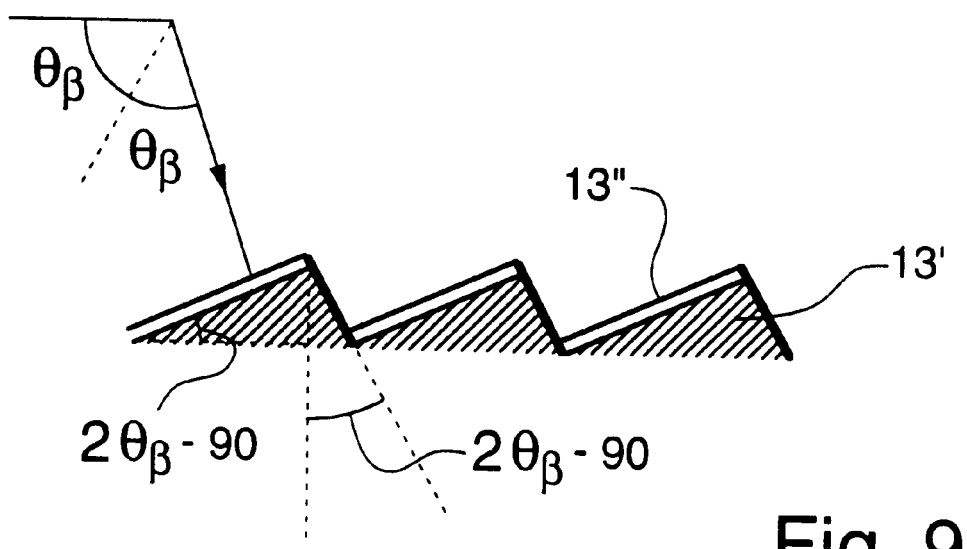
FIG. 9 is an enlarged view of part of the Fresnel structure of FIG. 8.

We shall now describe, with reference to FIGS. 8 and 9, other improvements that can be made to the optical polarization device of the present invention. To obtain an even more compact system, we can replace the plane mirror 13 in FIG. 3 by a reflective-type Fresnel system 13', as shown in FIG. 8. In this case, the angle β made by the Fresnel structure with respect to its bottom surface is equal to $2\theta_\beta-90°$ (FIG. 9). This linear Fresnel structure is coated with a reflective coating 13" in a known manner to reflect the beam towards the quarter-wave plate.

The other items in FIG. 8 are identical to those described with reference to FIG. 4 and carry the same reference numbers.

In addition, in the framework of the present invention, for the field lens we can use a lens such as the one described in the French patent application No. 95 04477 filed by the Applicant, which is a lens formed by a set of elementary surfaces each of which is associated with a function corresponding to a point to be illuminated on the axis and to an angle made by the median plane passing through the point to be illuminated with the horizontal plane, the inclination of said set of the elementary surfaces being obtained by interpolating these functions with a specific polynomial function. Such a lens is known as a free surface or "free form" lens.

The whole system described above offers many advantages, notably the aperture of the projection objective can be limited relative to prior-art systems, which makes the system much more inexpensive, while providing efficient recombination of the two polarized beams, thus significantly reducing losses of light energy.

What is claimed is:

1. Optical polarization device including:

a source of light emitting a light beam;

a polarization beam splitter for reflecting the s-polarization component of the light beam and transmitting the p-polarization component comprising a stack of at least two transparent plates separated by a layer of air;

means of reflection for receiving the component reflected by said polarization beam splitter, rotating its plane of polarization through 90° then returning it to said polarization beam splitter, wherein said means of reflection includes a single reflector, wherein said single reflector is constituted by a linear Fresnel structure with a reflective coating; and means of recombination of the two polarization components of the light beam so as to obtain a collimated beam constituted by a plate of micro-prisms functioning in reflection total.

2. Device according to claim 1, wherein an angle B made by said reflective surface relative to a plane surface of said Fresnel structure is equal to $2\Theta_\beta-90°$ wherein $\Theta_\beta$ is the angle of incidence of the light beam from said polarization beam splitter relative to a normal to said plane surface of the plate of micro-prisms.

3. Optical polarization device including:

a source of light emitting a light beam;

a polarization beam splitter reflecting the s-polarization component of the light beam and transmitting the p-polarization component;

means of reflection receiving th component reflected by said polarization beam splitter, rotating its plane of polarization through 90° then returning it to said polarization beam splitter, said means comprising a linear Fresnel structure with a reflective coating;

means of recombination of the two polarization components of the light beam so as to obtain a collimated beam constituted by plate of micro-prisms functioning in reflection total.

4. Device according to claim 3, wherein the angle B made by said reflective surface relative to plane surface of said Fresnel structure is equal to $2\Theta_\beta-90°$ wherein $\Theta_\beta$ is the angle of incidence of the light beam from said polarization beam splitter relative to a normal to the plane sure of the plate of micro-prisms.

5. Device according to claim 3, wherein the polarization beam splitter is constituted by a stack of at least two transparent plates separated by a layer of air.

6. Device according to claim 3, wherein the plate of micro-prisms is a plate of which the surface receiving the polarization components of the light beam is constituted by a number of prismatic elements arranged in parallel rows, the other surface being plane and transmitting the collimated beam, in which each adjacent inclined surface of said prismatic elements makes an angle with a normal to said plane surface, this angle satisfying the following conditions:

$$\cos(\alpha+\Theta_\beta)=n\cos(3\alpha)$$

$$(90°-\alpha)>\Theta_{critical}$$

where $\Theta_{critical}=\text{Arc }\sin(1/n)$ and $\Theta_\beta$ is the angle of incidence of the light beam from said polarization beam splitter relative to a normal to said plane surface and n is the refractive index of said plate of microprisms.

\* \* \* \* \*